United States Patent Office 3,363,950
Patented Jan. 16, 1968

3,363,950
SELF-ALIGNING BEARING STRUCTURES
James D. Cole, 125 Prairie Ave.,
Park Ridge, Ill. 60068
Filed Feb. 23, 1965, Ser. No. 434,244
4 Claims. (Cl. 308—72)

The present invention relates to improvements in self-aligning bearing structures, and more particularly to an antivibration bearing for small electric motors.

One object is to provide a self-aligning bearing having sound deadening and dampening qualities in which the rotating parts are isolated from the stationary structure by means of a yielding resilient member interposed therebetween.

Another object is to provide a low cost self-aligning bearing for electric motors and the like in which the main or armature shaft is rotatably supported by spaced plain bearing members which are resiliently and yieldingly supported in the ends of the motor housing by resilient ring members such as O-rings formed of rubber, or synthetic rubber compositions.

A further object is to provide a self-aligning bearing structure constructed to absorb end shock created by a shaft thrust between the rotating and nonrotating parts of the motor.

Another object is to provide a self-aligning bearing structure having varying degrees of self alignment and thus more accurately control the degree of alignment in high volume production.

Other objects and advantages of the invention will become apparent during the course of the following description of the accompanying drawing wherein.

Figure 1:
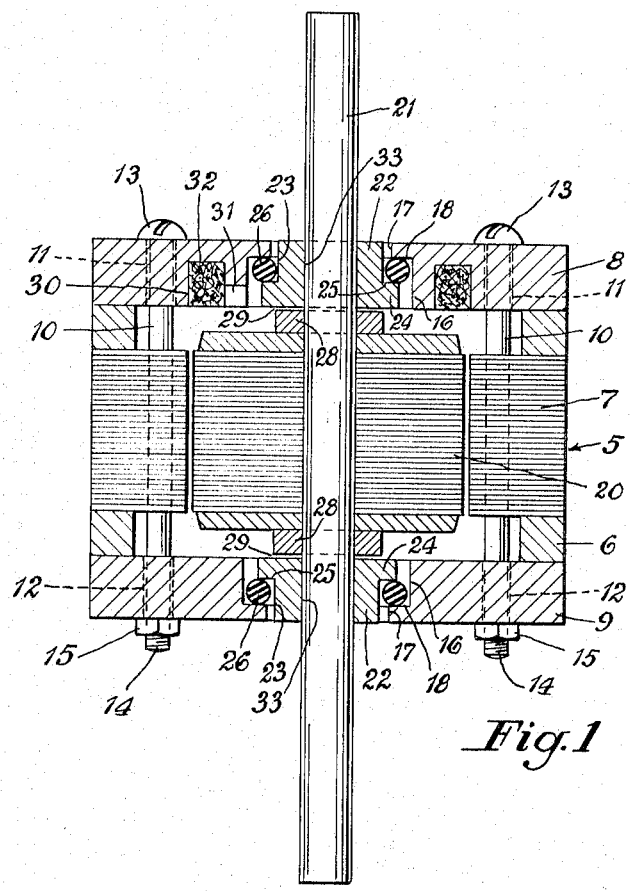
FIGURE 1 is a diametral cross-sectional view of an electric motor showing the manner in which the self-aligning bearing structure is assembled therein.
Figure 2:
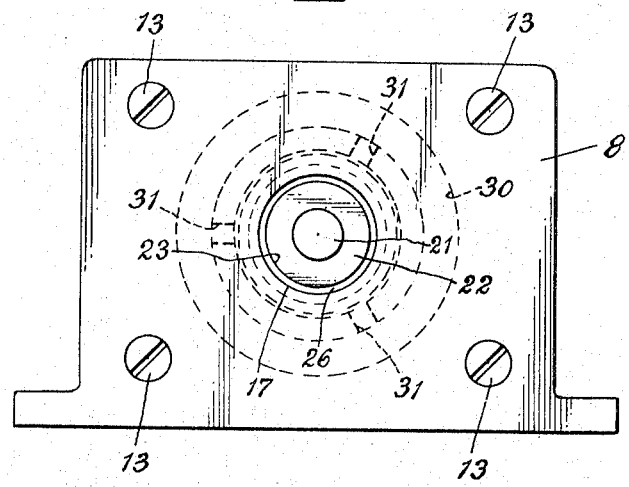
FIGURE 2 is an end elevational view of the electric motor showing the arrangement of the various parts.

In the drawing, and more in detail, attention is directed to FIGURE 1 wherein there is shown an electric motor of the miniature type generally designated 5 having a frame structure 6 for supporting the stator 7. End bearing plates 8 and 9 are secured to the frame structure 6 by clamping bolts 10 which extend through openings 11 and 12 in the respective end plates 8 and 9 and said bolts are provided with heads 13 on one end, while the opposite ends are threaded as at 14 for receiving anchoring and clamping nuts 15. The end plates 8 and 9 are provided with central openings 16 which are reduced in diameter as at 17 to provide internal shoulder portions 18. The openings 16 in the end plates are aligned so that the axis thereof is centered with respect to the rotor bore of the laminated motor structure.

The armature or rotor 20 may include the usual laminated core structure and field winding or rotor bars (not shown) and suitable commutation may be provided therefor. The armature 20 is mounted on an armature shaft 21 to which is applied spaced flanged bearings 22 which are reduced as at 23 to provide shoulder portions 24 of increased diameter. The enlarged shoulder portion 24 of the flanged bearings provide annular seating portions 25 in spaced opposed relation to the seating portions 18 between the bores 16 and 17.

Mounted between said seating faces 18 and 25 is a resilient flexible ring member 26 which may be of round or rectangular section and preferably formed of a resilient material such as one of the synthetic resin compositions, synthetic rubber compositions or natural rubber. The resilient ring 26 can be formed of a rubber O-ring and is adapted to be held in place between the radial surfaces 18 and 25 of the end plates 8 and 9 and the flanged bearing members 22 by means of spacing washers 28 which are disposed between the end surfaces of the armature 20 and the inner radial faces of the bearing members 22. A slight space 29 is provided between the thrust washers 28 and the plain bearing members 22 to permit slight end play of the armature shaft 21 and to prevent the parts from binding.

The motor 5 may be of any conventional type and it is pointed out that the O-rings 26 are snugly fitted in place so that the bearing 22 will remain fixed with respect to the motor 5. Also, it is pointed out that the bearing 22 is supported by the O-ring 26 in a position substantially midway between its opposed radial faces. Hence, the armature shaft 21 can seek a position of self-alignment without creating wear on the armature shaft which generally occurs when employing self-aligning bearings of the spherical socket type in which the bearing is worn bell shaped. In the present bearing structure the resilient ring 26 being located between the two ends of the radial faces 7 exerts a line contact pressure on the bearing under axial load conditions.

The bearing structure is adapted to be lubricated and as shown in FIGURE 1 the inner wall of the bearing plate 8 is provided with an annular channel 30 concentric to the bores 16 and communicating therewith through one or more circumferentially spaced radially extending passageways 31 arranged in equidistantly circumferentially spaced relation. A suitable lubricating material 32 can be packed in the annular channel 30 for lubricating the contact faces between the plane bearings 22 and the thrust bearings 28 and the surfaces 33 of the bearing bores which accommodate the rotary armature shaft 21. The material 32 comprises a grease and said annular channel forms a grease reservoir to lubricate the various parts. Thus, it will be seen, that the armature shaft 21 will rotate freely when the armature 20 is energized and that noise will be reduced by the resilient O-ring breaking the path of conduction from the armature shaft to the structure on which the motor is mounted.

Vibrational noises in conventional structures of the present type are transmitted in two modes. The first is vibration normal to the shaft caused by external and internal mechanical unbalance and also by unbalance due to electrical forces. Since the mechanical and electrical unbalance forces occur at different frequencies there is present the sum and difference of the forces set up by all mechanical and electrical forces. The second vibrational mode is generated by the axial component of dynamic unbalance, the skew of the rotor, the magnetic centering force between the rotor and stator and forces generated by the external load. The above described structure isolates both of these noise producing modes quite effectively.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

What I claim is:

1. A self-aligning bearing assembly for a small electric motor having a frame structure and end bearing plates secured thereto, said end plates being provided with axially aligned central openings, the outer ends of which being reduced in diameter to provided internal radial faces extending perpendicular to the axis of rotation of said motor, a bearing sleeve mounted in each said opening, a rotor shaft extending rotatably through said bearing sleeves, said bearing sleeves having each an annular enlarged portion extending from an outwardly directed smaller diameter portion so as to provide a radial face opposed to and axially spaced from said internal radial faces in said central openings, a single resilient O-ring of circular cross-section mounted substantially on the center portion between the ends of each bearing sleeve and solely contacted by each of said opposed radial faces.

2. A self-aligning bearing assembly for a small electric motor having a frame structure and end bearing plates secured thereto, said end plates being provided with axially aligned central openings, the outer ends of which being reduced in diameter to provided internal radial faces extending perpendicular to the axis of rotation of said motor, a bearing sleeve mounted in each said opening, a rotor shaft extending rotatably through said bearing sleeves, said bearing sleeves having each an annular enlarged portion extending from an outwardly directed smaller diameter portion so as to provide a radial face opposed to and axially spaced from said internal radial faces in said central openings, a single resilient O-ring of circular cross-section mounted substantially on the center portion between the ends of each bearing sleeve and solely contacted by each said opposed radial faces, the outer reduced diameters of said central apertures being radially spaced from said smaller diameter portions of said bearing sleeves, and the outer diameters of said enlarged portions of said bearing sleeves being radially spaced from the circular walls formed by the inner ends of said central openings.

3. A self-aligning bearing assembly according to claim 1, including a rotor within said frame structure and mounted on said rotor shaft and thrust washers between the ends of said rotor and the bearing sleeves to hold the latter in their operative position in said central openings in said end plates.

4. A self-aligning bearing assembly according to claim 1, including a rotor within said frame structure and mounted on said rotor shaft and thrust washers between the ends of said rotor and the bearing sleeves to hold the latter in their operative position in said central openings in said end plates, the inner faces of said end bearing plates being provided with an annular lubricant containing channel concentrically arranged to said central openings and connected with the latter by passageways which conduct the lubricant from said annular channel to said openings and into the bearing sleeves to lubricate the rotor shaft.

References Cited
UNITED STATES PATENTS

| | | | |
|---|---|---|---|
| 1,323,626 | 12/1919 | Garman | 308—26 |
| 2,015,784 | 10/1935 | Brown | 308—184 |
| 2,525,911 | 10/1950 | Keene et al. | 308—26 |
| 2,530,323 | 11/1950 | Boyd | 308—184 |
| 2,588,636 | 3/1952 | Korsgren | 308—184 |
| 2,937,058 | 5/1960 | Boggs | 308—132 |

MARTIN P. SCHWADRON, *Primary Examiner.*

R. F. HESS, *Assistant Examiner.*